No. 860,096. PATENTED JULY 16, 1907.
O. A. JOHANSSON.
FRICTION CLUTCH.
APPLICATION FILED FEB. 23, 1907.
2 SHEETS—SHEET 1.
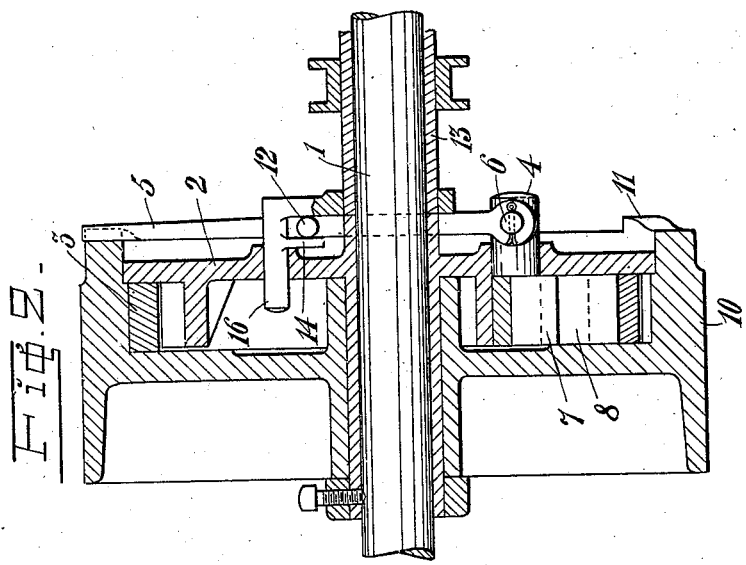
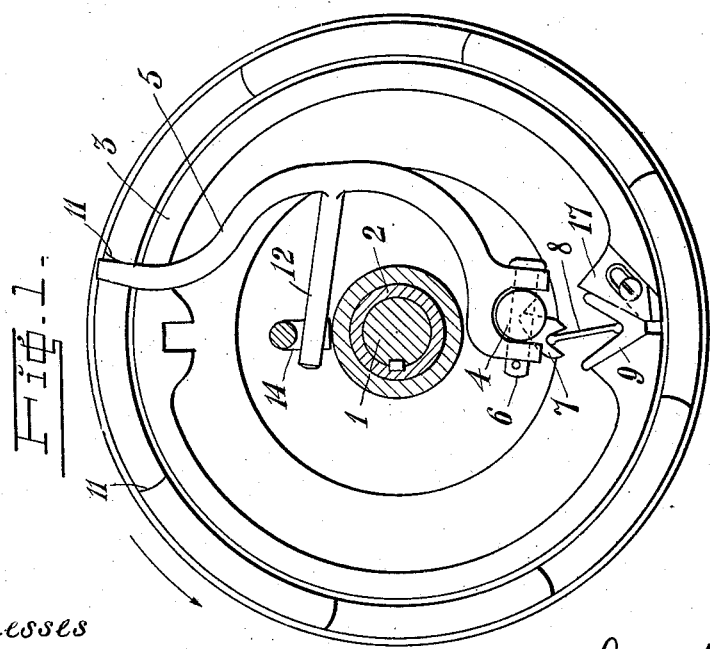
Witnesses
Inventor No. 860,096.
PATENTED JULY 16, 1907.
O. A. JOHANSSON.
FRICTION CLUTCH.
APPLICATION FILED FEB. 23, 1907.
2 SHEETS—SHEET 2.
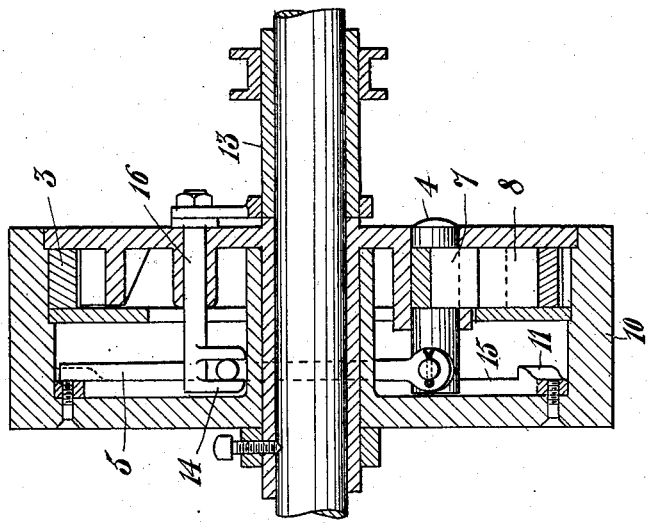
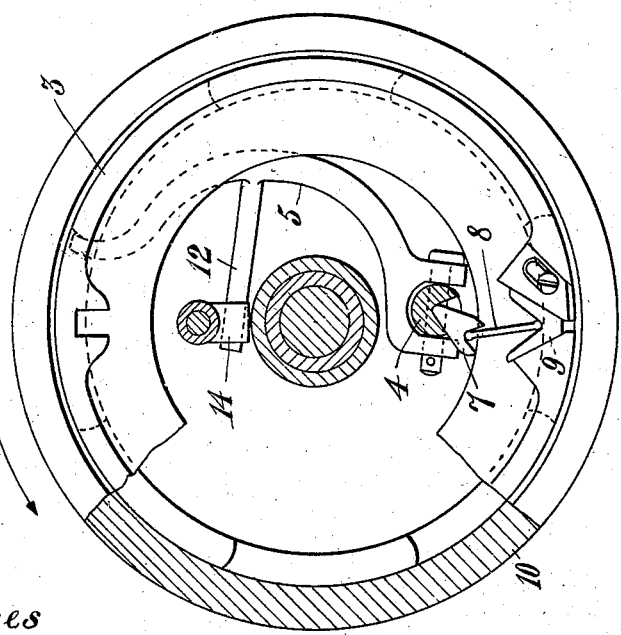
Witnesses
Inventor

UNITED STATES PATENT OFFICE.

OLOF AUGUST JOHANSSON, OF KARLSHAMN, SWEDEN.

FRICTION-CLUTCH.

No. 860,096.　　　　　Specification of Letters Patent.　　　　Patented July 16, 1907.

Application filed February 23, 1907. Serial No. 358,793.

*To all whom it may concern:*

Be it known that I, OLOF AUGUST JOHANSSON, a subject of the King of Sweden, and a resident of Karlshamn, Sweden, have invented new and useful Improvements in Friction-Clutches, of which the following is a specification, reference being had to the drawing accompanying and forming a part hereof.

This invention relates to the kind of clutches for conveying rotary motion known as expanding-ring friction clutches, *i. e.* to friction clutches of the kind having a split expanding-ring placed in the one clutch part, or member, and adapted to partake in the movement of the other clutch part, or member, said expanding-ring being actuated by a wedge operating to throw the expanding-ring into engagement with the first clutch part for tightening the clutch. These friction clutches have the advantage that the driving member of the clutch automatically tightens the expanding-ring as long as any relative movement exists between the driving member and the driven one. As soon as this relative movement ceases, *i. e.* the driven member has reached the same speed of rotation as the driving member, the expanding of the ring ceases so that unnecessary hard tightening is avoided, at the same time as any slipping is obviated.

The object of the invention is to so arrange the clutch as to make it possible to easily and reliably connect or disconnect the clutch parts.

The invention consists, chiefly, in that the connection or disconnection of the clutch parts is performed by a lever pivotally attached to the one clutch part in such a manner as to be able to swing in two different planes, said lever being adapted to be engaged by the other clutch part and, thereby, caused to act upon the tightening wedge through the intermedium of a toggle-joint or other means.

In the drawings, I have illustrated, by way of example, two forms of expanding-ring friction clutches embodying my invention.

Figures 1 and 2 show the one form in elevation and section respectively. Figs. 3 and 4 are corresponding views of the second form of the clutch.

Referring to the drawings, the shaft 1 carries a cup- or shell-shaped part 2 secured to the shaft and forming one member of the clutch (said cup or shell having, for the sake of clearness, been removed in Figs. 1 and 3). The split, elastic expanding-ring 3 is caused, by a lug or projection from the cup or shell 2, to partake in the movement of the latter. Journaled in the cup or shell 2 is a bolt or the like 4, and pivotally attached to the said bolt is a lever 5. In the two forms illustrated the lever 5 is carried by a pin 6 inserted through the bolt 4, at right angles thereto, but the invention is, obviously, not limited to this particular construction as it can be modified in details, only the lever 5 is adapted to turn in two different planes. Attached to the bolt 4 is a small arm or cam 7 forming together with the link 8 a toggle-joint acting upon the wedge 9. The latter is placed, in any well-known manner, between the obliquely cut ends of the split ring 3 so as to be able to widen the latter and tighten it against the outer shell 10 loosely mounted around the inner one 2, said outer cup or shell being thought, in the forms illustrated, to be the driving part. The movement can, however, also be transmitted from the shaft 1 to the cup or shell 10. The latter is shown to form a pulley and is provided, at the side adjacent to the lever 5, with lugs 11, or the like, adapted to engage the lever so as to cause the latter to partake in the revolution of the shell 10 in the direction of the arrows (Figs. 1 and 3). The lever is thus caused to turn about the axis of the bolt 4 so that its free end moves to the left (Figs. 1 and 3), whereby the toggle-joint 7, 8 causes the wedge to expand the ring 3 so that the latter is tightened against the cup or shell 10 and causes the shell 2 to partake in the revolution.

In order to easily engage or disengage the lever 5 the latter is provided with an arm 12 entering between the shanks of a fork 14 attached to a sleeve 13 or the like slidably mounted on the shaft 1. When the clutch parts are to be thrown into engagement, the sleeve 13 is moved by a fork or the like (not shown) toward the clutch, whereby the lever 5 is caught by one of the lugs 11 and turned in the direction of the arrow so as to expand the ring 3. As soon as the friction has grown sufficiently high to cause the driven part to partake in the revolution, the lever 5 ceases to move relatively to the shell 2, and the degree of tightening of the expanding ring will thus regulate itself according to the torque. At the least sliding between the ring 3 and the shell 10 the former is immediately tightened harder and the transmission of motion is thus fully reliable. When the lever 5 is disengaged from the shell 10, it is brought back by the ring 3 into its original position.

In order to cause the sleeve 13 to partake in the revolution of the shell 2, the fork 14 is provided with a pin 16 passing through a corresponding aperture in the cup or shell 2.

The form of construction illustrated in Figs. 3 and 4 differs from that shown in Figs. 1 and 2 only in that the lever 5 is placed within the shell 10 (between the two clutch parts 2 and 10) so as to be totally hidden. The bolt 4 here extends inwardly. The lugs 11 coöperating with the lever 5 are carried by a ring 15 attached to the inside of the plane end-wall of the shell 10. For engaging or disengaging the lever also here a longitudinally movable sleeve 13 is used, said sleeve carrying a bolt or pin 16 forming, at its inner end, a fork 14 engaging the lever-arm 12.

In order to make it possible to regulate the action of the wedge 9 upon the expanding-ring 3 (for instance to adjust for wear) a part 17 is adjustably attached to the ring 3, at the one side of the wedge, suitably by a screw or the like.

Having now described my invention, what I claim as new and desire to secure by Letters Patent is:—

1. The combination with a friction clutch having a split ring adapted to partake in the revolution of the one clutch part, and a wedge adapted to expand the said ring and, thereby, tighten it against the other clutch part, of a lever carried by the first clutch part in such a manner as to be able to swing in different planes, said lever being engaged by the other clutch part, when it is swung in one plane into operative position, and means interposed between the lever and the wedge for causing the latter to expand the ring, when the lever is turned, by the said clutch part, in another plane, substantially as and for the purpose set forth.

2. The combination with a friction clutch having a split ring adapted to partake in the revolution of the one clutch part, and a wedge adapted to expand the said ring and, thereby, tighten it against the other clutch part, of a lever mounted in the first clutch part in such a manner as to be able to swing in different planes, lugs carried by the other clutch part, said lugs being adapted to engage the said lever, when the latter is swung in one plane into operative position, and means interposed between the lever and the wedge for causing the latter to expand the ring, when the lever is turned by a lug in another plane, substantially as and for the purpose set forth.

3. The combination with a friction clutch having a split ring adapted to partake in the revolution of the one clutch part, and a wedge adapted to expand the said ring and, thereby, tighten it against the other clutch part, of a lever mounted in the first clutch part in such a manner as to be able to swing in different planes, lugs carried by the other clutch part, said lugs being adapted to engage the said lever when the latter is swung in one plane into operative position, and a toggle-joint interposed between the lever and the wedge for causing the latter to expand the ring, when the lever is turned by a lug in another plane, substantially as and for the purpose set forth.

4. The combination with a friction clutch having a split ring adapted to partake in the revolution of the one clutch part, and a wedge adapted to expand the said ring and, thereby, tighten it against the other clutch part, of a bolt mounted in the first clutch part in such a manner as to be able to turn about its longitudinal axis, a lever pivotally attached to the said bolt in such a manner as to be able to swing about an axis at right angles to the longitudinal axis of the bolt, an arm extending from the said lever, a clutch operating device engaging the said arm, said clutch operating device being slidably mounted on the shaft carrying the one clutch part so as to be able to swing the lever relatively to the bolt, lugs carried by the other clutch part, said lugs being adapted to engage the said lever, when it is swung, by the clutch operating device, into operative position, and a toggle-joint interposed between the lever and the wedge for causing the latter to expand the ring, when the bolt carrying lever is turned by such a lug, substantially as and for the purpose set forth.

5. The combination with a friction clutch having a split ring adapted to partake in the revolution of the one clutch part, and a wedge adapted to expand the said ring and, thereby, tighten it against the other clutch part, of a lever carried by the first clutch part in such a manner as to be able to swing in different planes, said lever being engaged by the other clutch part, when it is swung in one plane into operative position, means interposed between the lever and the wedge for causing the latter to expand the ring, when the lever is turned, by the said clutch part, in another plane, and means for adjusting the length of the expanding ring, substantially as and for the purpose set forth.

6. In a friction clutch the combination with the clutch parts, of a split ring adapted to partake in the revolution of the one clutch part, a wedge adapted to expand the said ring and, thereby, tighten it against the other clutch part, a lever mounted in the first clutch part in such a manner as to be able to swing in different planes, lugs carried by the other clutch part, said lugs being adapted to engage the said lever, when the latter is swung in one plane into operative position, a toggle-joint interposed between the lever and the wedge for causing the latter to expand the ring, when the lever is turned by a lug in another plane, and means for adjusting the length of the expanding ring, substantially as and for the purpose set forth.

In testimony whereof I have signed my name to this specification in the presence of two subscribing witnesses.

OLOF AUGUST JOHANSSON.

Witnesses:
C. VELANDEX,
KARL ANDERSSON.